2 Sheets—Sheet 1.

C. LIDREN,

Assignor to E. B. HAMLIN.

Harvester-Rake.

No. 8,727. Reissued May 27, 1879.

*Attest:*

Clarence Poole

L M Seely

*Inventor:*

Christopher Lidren;

by Elliot & Pear

Attys.

N. PETERS, PHOTO-LITHOGRAPHER, WASHINGTON, D. C.

2 Sheets—Sheet 2.

C. LIDREN,

Assignor to E. B. HAMLIN.

Harvester-Rake.

No. 8,727. Reissued May 27, 1879.

*Attest:*

Clarence Poole.

L. M. Seely

*Inventor:*

Christopher Lidren;

by Ellis Spear

Atty

N. PETERS, PHOTO-LITHOGRAPHER, WASHINGTON, D. C.

UNITED STATES PATENT OFFICE.

CHRISTOPHER LIDREN, OF LA FAYETTE, INDIANA, ASSIGNOR TO EVERLYN B. HAMLIN, OF ST. LOUIS, MISSOURI.

IMPROVEMENT IN HARVESTER-RAKES.

Specification forming part of Letters Patent No. 74,836, dated February 25, 1868; Reissue No. 8,727, dated May 27, 1879; application filed January 18, 1879.

*To all whom it may concern:*

Be it known that I, CHRISTOPHER LIDREN, of La Fayette, in the county of Tippecanoe and State of Indiana, have invented a new and useful Improvement in Raking and Binding Attachments for Reaping-Machines, which is fully described in the following specification, reference being had to the accompanying drawings, in which—

Figure 1:
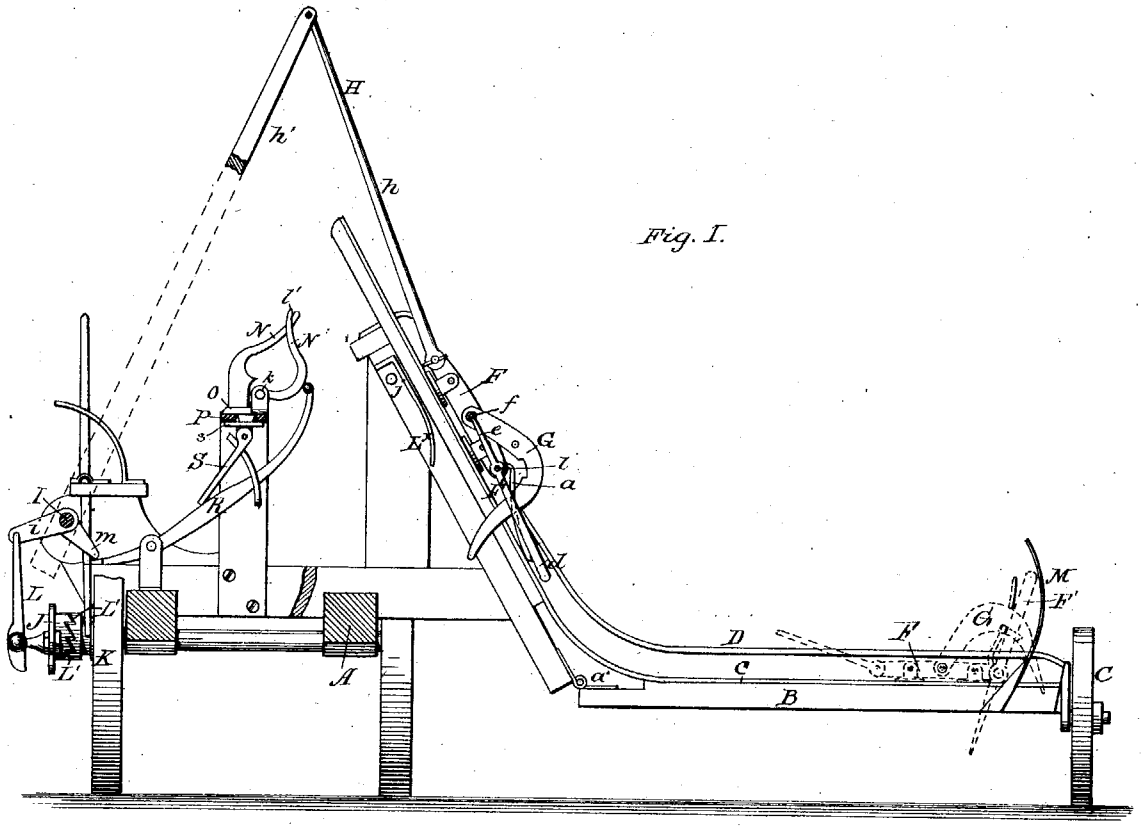
Figure 2:
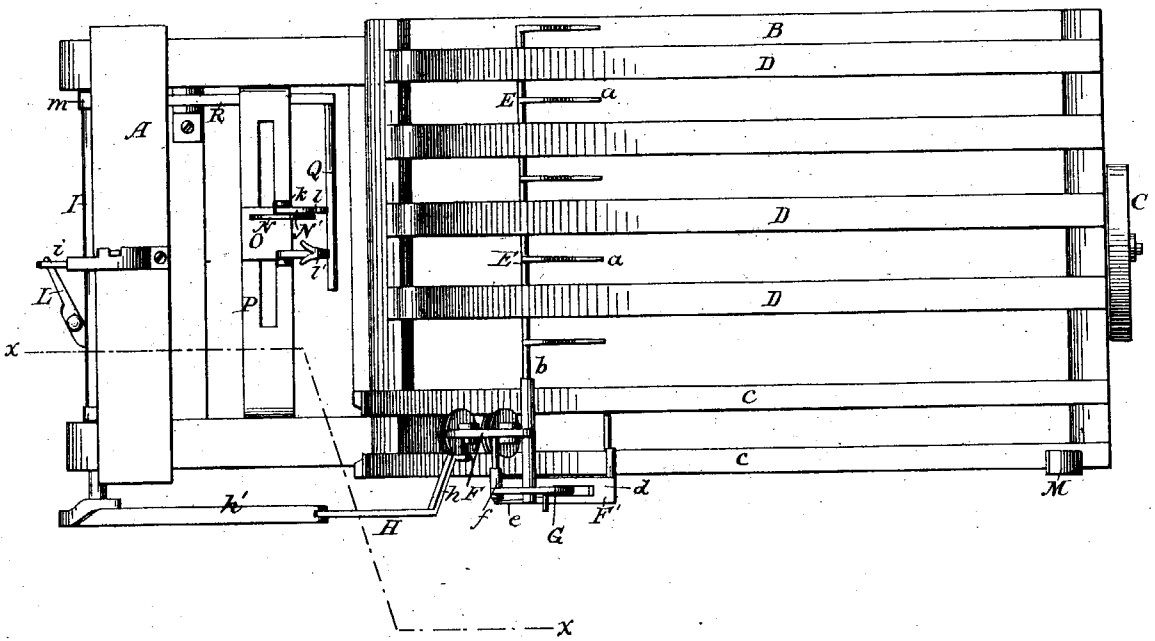

Figure 1 is a front elevation of a reaping-machine embodying my improvements, partly in section, on the line *x x*, Fig. 2; and Fig. 2, a plan view of the same.

The invention relates to a new and improved attachment for automatically raking and binding grain, and is designed to be applied to reaping-machines and receive its motion from one of the driving-wheels thereof.

The invention consists in a binding-arm or device for placing the band around the bundle, which is adjustable in the direction of the length of the grain as it is delivered to be bound, so as to regulate the position of the band on the bundle to suit different lengths of grain.

It also consists in a device for compressing the gavel, which is also adjustable relatively to the length of the grain.

It also consists in other devices and combinations of devices, all of which will be hereinafter fully described, and more particularly defined in the claims.

In the drawings, A represents the main frame of the machine, to which the platform B is connected by hinges *a′ a′*, the outer end of said platform being supported by a grain-wheel, C. A series of parallel metallic bars, D, are arranged above the platform, being made quite thin, in order that they may yield or bend to permit the platform to rise and fall to conform to the inequalities of the ground over which it may pass.

The upper ends of the bars D are attached to the inner side of the main frame A, and the lower ends are attached to the cross-bar at the outer end of B.

A rake, E, is arranged to move across the platform and up the inclined elevator, the teeth *a* of which are slightly curved, and are attached to a rod, *b*, one end of which has its bearing in a carriage, F, which works between guides *c c* attached to the rear of the platform and main frame. This carriage has a reciprocating movement given it to cause the rake E to work back and forth over the platform, the teeth *a* during the working movement of the rake extending up between the bars D.

On the end of the rake-head or rod *b* there is secured a lever, F′, one arm, *d*, of which is longer than the other one, *e*. The long arm is slotted to admit of a curved bar, G, passing loosely through it, said bar being fitted loosely at one end on an arm, *f*, which projects from the carriage F, and having a notch, *g*, made in it to catch and hold the lever F′, and consequently the rake-teeth *a*, when the latter are at work or raking or carrying up the grain from the platform.

The reciprocating movement is given the rake E by means of the jointed arms *h h′*, one arm, *h*, of which is attached to the carriage F, and the other arm, *h′*, attached to one end of a rock-shaft, I, at the outer side of the main frame A. This shaft I receives its motion from an arm, J, on the axle of the outer wheel, K, of the main frame, said arm being connected with an arm, *i*, on the rock-shaft by a link, L, the lower end of which is attached to an adjustable wrist in the arm J. This arm J is fitted loosely on the axle of the wheel K, and may be connected and disconnected from said axle by means of a clutch, L′.

An upright supporting-frame, P, is attached to the main frame A, and provided with a slot, *p*, and forms ways, on which the binding-carriage is moved back and forth. A carriage, O, is arranged to move back and forth upon the top of this support, and is provided with a projection or guide, *o*, which passes down through the slot *p*, and is provided at its lower end with a cam-lever, S, pivoted to the lower end thereof. Between this lever and the under side of the ways is a plate or washer, *s*, which is clamped against the under side of the cross-bar, when the cam-lever is turned down, thereby fastening the carriage O in place.

The carriage O is supplied with two curved arms or hooks, N N′, the first of which is rigidly attached to the carriage, and the latter of which is hinged thereto by a joint or pivot, *k*, at the base of the arm N. Another arm, *l*, which at its outer end is provided with a fork, *l'*, is also hinged to the carriage, and holds and places the band. The hinged arms N' and *l* rest upon a bar, Q, which projects at right angles from a lever, R, pivoted on the main frame. This lever R is operated by means of an arm, *m*, on the rock-shaft I, and at such intervals as to vibrate the lever and raise the curved arms at the proper moment for binding.

The support P is so arranged relatively to the incline up which the grain is elevated, and at the upper end of which it is delivered, that when the arms N' and *l* are dropped or thrown back they will be in position to receive the grain as it is delivered. The fork *l'* in the arm *l* is designed to hold one end of the band during this delivery of the grain upon the arms. The operation of the lever R then forces up the binder-arm *l* and the arm N', and the bundle is compressed between the latter and the arm N, and at the same time the end of the band is carried around the bundle by the arm *l*, so that the two ends of the band may be readily grasped by the operator or binder as the gavel is compressed.

It is evident, therefore, that the gavel is bound as delivered, the location of the band on the bundle being determined by the position of the band-placing arm *l*.

Now, as the carriage O is readily moved back and forth on its supporting-ways in the direction of the length of the grain as it is delivered to be bound, it is evident that the arm which carries the band may be adjusted to any position required to place the band around the bundle at the proper distance from the butts to suit different lengths of grain. This adjustment is effected simply by raising the hand-lever S to relieve the cam, and then moving the carriage in the desired direction by means of this same lever, the carriage being guided on its ways by the devices described above. As the compressor-arm is attached to the carriage, it also is adjusted by the movement of the latter to suit grain of different lengths.

The operation is as follows: As the rake moves up the bars D, or toward the main frame A, the teeth *a* are elevated, so as to gather or rake up the grain, and when the rake has nearly reached the upper ends of the bars D the lower end of the curved bar G comes in contact with a projection, L, on the front side of the main frame, and the bar G is raised, so as to release the rake E. As soon as the arm F' is released from the notch in the curved bar G the arm *e* of the lever F' comes in contact with the pin *j*, which holds up the teeth until the grain is discharged. After arm *e* has cleared the pin *j* the rake-teeth fall between the bars D by reason of their gravity. When the rake E nearly reaches the outer ends of the platform, the long arm *d* of lever F comes in contact with a curved bar, M, which causes the rake-teeth *a* to turn up until the lever F is caught by the notch in bar G. At this time the rake commences to move toward the main frame A, and again carries up the cut grain from the platform. The grain as it is delivered by the rake at the upper end of the inclined elevator falls upon the receptacle made for it by the arms on the carriage O, as above described. The arms *l* and N' are then lifted by the lever R, by which operation the bundle is compressed and the band put around it, which is then fastened by the binder.

It will be seen that the rake reciprocates back and forth over the platform and up the inclined elevator in the same path, following the contour of the grain platform and elevator as it moves back and forth.

Having thus described my invention, what I claim as new, and desire to secure by Letters Patent, is—

1. A binding arm or device for placing the band around the bundle, adjustable in the direction of the length of the grain as it is delivered to be bound, substantially as described.

2. A gavel-compressor adjustable in the direction of the length of the grain as it is delivered to be bound, whereby it is adapted to different lengths of grain, substantially as described.

3. The combination of the following elements, viz: a delivering mechanism which conveys the cut grain from the platform to the binder, a binding-arm or band-placer adjustable in the direction of the length of the grain as it is delivered to be bound, and a gavel-compressor, also adjustable in the same direction, whereby the binder is adapted to different lengths of grain, substantially as described.

4. A carriage adjustable in the direction of the length of the grain as it is delivered to be bound, in combination with a binding-arm or band-placer mounted thereon, substantially as described.

5. A carriage mounted on guideways, on which it may be moved back and forth in the direction of the length of grain as it is delivered to be bound, in combination with a binding-arm or band-placer mounted on the carriage, substantially as described.

6. An elevated side-delivering mechanism, in combination with a binding apparatus adjustable in the direction of the length of the grain as it is delivered to be bound, substantially as described.

7. The combination of the following elements, viz: a grain elevating and delivering mechanism, a carriage adjustable relatively to the length of the grain as it is delivered to be bound, a binding-arm or band-placer mounted on said carriage, and a device connected to the carriage whereby the latter may be adjusted by the attendant while riding on the machine and without interrupting the delivery of the grain, substantially as described.

8. The hinged platform B, in connection with the elastic metallic bars D, constructed, arranged, and applied in the manner substantially as and for the purpose herein set forth.

9. The reciprocating rake E, when operated from the wheel K of the main frame through the medium of the jointed arms *h h'*, rock-shaft I, link L, and the slotted arm J on the axle of wheel K, all arranged substantially as shown and described.

10. The carriage F, in which the rake-head or rod *b* is fitted, in combination with the lever F', curved bar G, projection L, pin J, and the curved bar M, all arranged to operate or adjust the rake, substantially as set forth.

11. The hooks N N', arranged as shown, the latter operated from the rock-shaft I through the medium of the lever R and the arm *m* on the rock-shaft, all arranged substantially as specified.

CHRISTOPHER LIDREN.

Witnesses:
H. W. MOORE,
F. W. SPENCER.